(12) United States Patent
Peck et al.

(10) Patent No.: US 10,665,084 B1
(45) Date of Patent: May 26, 2020

(54) RETROFIT COMPLIANCE APPARATUS AND COMPLIANCE SYSTEM FOR HAND HYGIENE DISPENSERS

(71) Applicant: SWIPESENSE, INC., Chicago, IL (US)

(72) Inventors: John R. Peck, Pleasanton, CA (US); Harikrishna K. Rajabather, Dallas, TX (US); Thomas F. Racke, Highland Park, IL (US); Horace Y. Wang, Chicago, IL (US); Yuri F. Malina, Chicago, IL (US)

(73) Assignee: SwipeSense, Inc., Chicago, IL (US)

( * ) Notice: Subject to any disclaimer, the term of this patent is extended or adjusted under 35 U.S.C. 154(b) by 0 days.

(21) Appl. No.: 15/962,920

(22) Filed: Apr. 25, 2018

Related U.S. Application Data

(60) Provisional application No. 62/490,400, filed on Apr. 26, 2017.

(51) Int. Cl.
| | | |
|---|---|---|
| *G08B 21/24* | (2006.01) | |
| *G06K 9/00* | (2006.01) | |
| *H04B 17/318* | (2015.01) | |

(52) U.S. Cl.
CPC ....... *G08B 21/245* (2013.01); *G06K 9/00382* (2013.01); *H04B 17/318* (2015.01); *G06K 2009/00395* (2013.01)

(58) Field of Classification Search
CPC . G06F 19/3418; G06F 17/00; G06K 7/10425; A47K 5/121; A47K 3/281; A47K 10/424
See application file for complete search history.

(56) References Cited

U.S. PATENT DOCUMENTS

| | | | |
|---|---|---|---|
| 2,762,532 A | 9/1956 | Packwood | |
| 5,540,350 A | 7/1996 | Lansky | |
| 6,123,449 A | 9/2000 | Sadek-Patt | |
| 8,179,375 B2* | 5/2012 | Ciesla | G06F 3/0202 178/18.01 |
| 8,193,820 B2* | 6/2012 | Nakagawa | B60R 21/01532 324/663 |
| 10,203,711 B2* | 2/2019 | Wegelin | H03K 17/941 |
| 2010/0123560 A1* | 5/2010 | Nix | H04Q 9/00 340/10.4 |

(Continued)

FOREIGN PATENT DOCUMENTS

GB 2293751 A 4/1996

*Primary Examiner* — Hoi C Lau
(74) *Attorney, Agent, or Firm* — Renaissance IP Law Group, LLP; David A. Crowther

(57) ABSTRACT

Embodiments of the present inventive concept include retrofit compliance apparatus, which can include a catch basin or drip tray. The retrofit compliance apparatus can be used in conjunction with a hand hygiene dispenser, and monitor for compliant usage of the dispenser. The retrofit compliance apparatus can include one or more microcontrollers and one or more sensors. The retrofit compliance apparatus can detect whether the dispenser has been properly used. The retrofit compliance apparatus can collect data allowing the determination of the identity of who used the dispenser. Historical information about valid dispense counts and invalid dispense counts for each individual user can be maintained by a remote server.

12 Claims, 11 Drawing Sheets

(56) References Cited

U.S. PATENT DOCUMENTS

| | | | |
|---|---|---|---|
| 2010/0171515 A1* | 7/2010 | Nakagawa | B60N 2/002 324/658 |
| 2011/0070348 A1* | 3/2011 | Burton-Wilcock | A47J 31/46 426/431 |
| 2013/0067816 A1* | 3/2013 | Chang | H03K 17/955 49/25 |
| 2013/0096729 A1* | 4/2013 | Wegelin | H03K 17/941 700/296 |
| 2013/0213995 A1* | 8/2013 | Horel | A47K 10/424 221/197 |
| 2014/0022181 A1* | 1/2014 | Bergman | G06F 3/0418 345/173 |
| 2014/0074285 A1* | 3/2014 | Wegelin | G06F 17/00 700/244 |
| 2014/0246099 A1* | 9/2014 | Herbert | E03C 1/057 137/78.1 |
| 2014/0253336 A1* | 9/2014 | Ophardt | A47K 5/1202 340/573.1 |
| 2014/0253348 A1* | 9/2014 | Maeda | B64D 43/02 340/966 |
| 2017/0061726 A1* | 3/2017 | Wegelin | G08B 21/245 |
| 2017/0215655 A1* | 8/2017 | Ophardt | A47K 3/281 |
| 2017/0318964 A1* | 11/2017 | McKnight | A61L 2/22 |
| 2017/0319014 A1* | 11/2017 | Ophardt | A47K 5/1217 |
| 2018/0042258 A1* | 2/2018 | Roberts | A47J 31/0615 |
| 2018/0111173 A1* | 4/2018 | Bertness | B08B 9/0325 |
| 2018/0132669 A1* | 5/2018 | Ophardt | A47K 5/1205 |
| 2018/0333013 A1* | 11/2018 | Starkey | A47K 10/36 |

\* cited by examiner

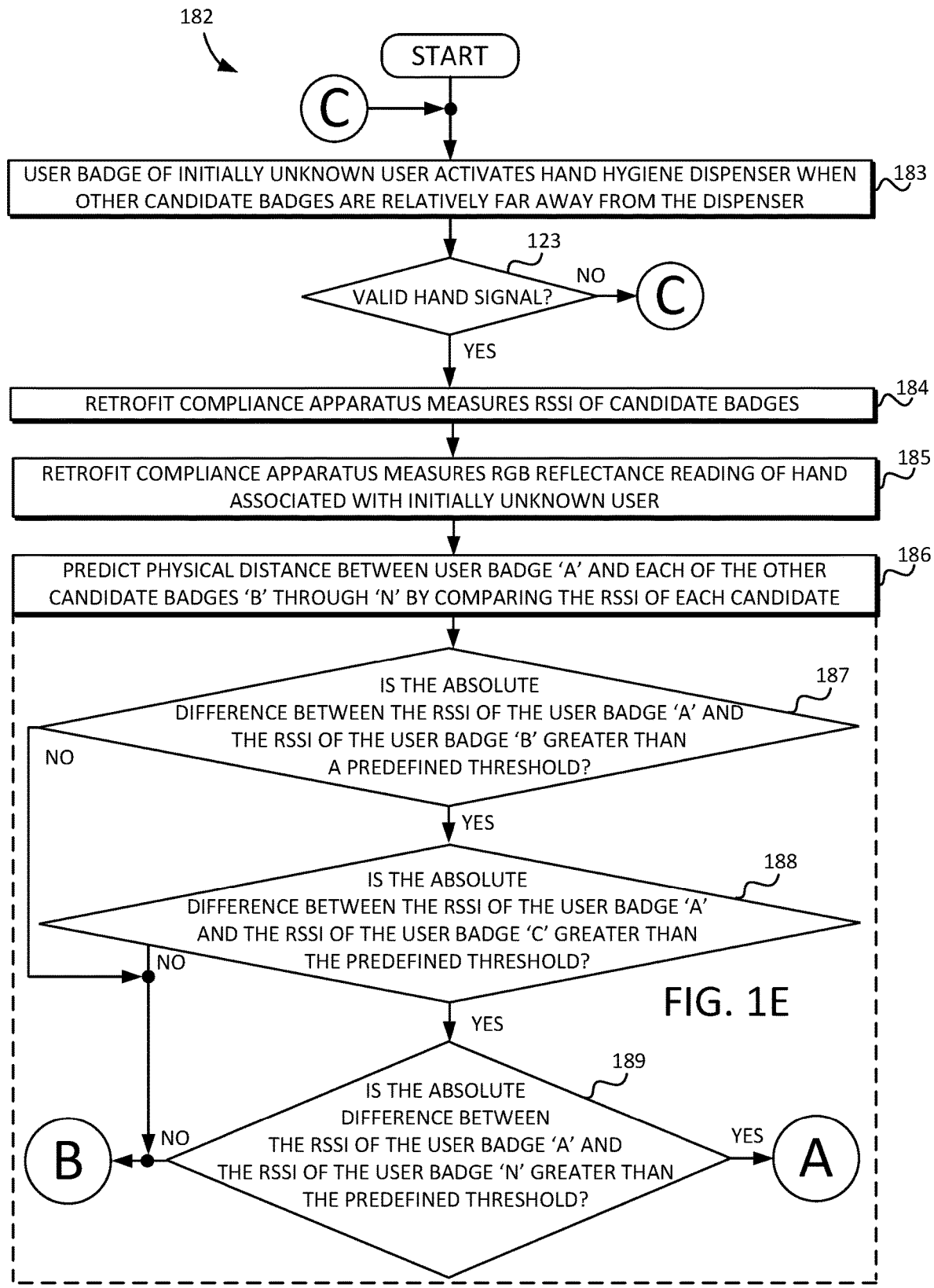

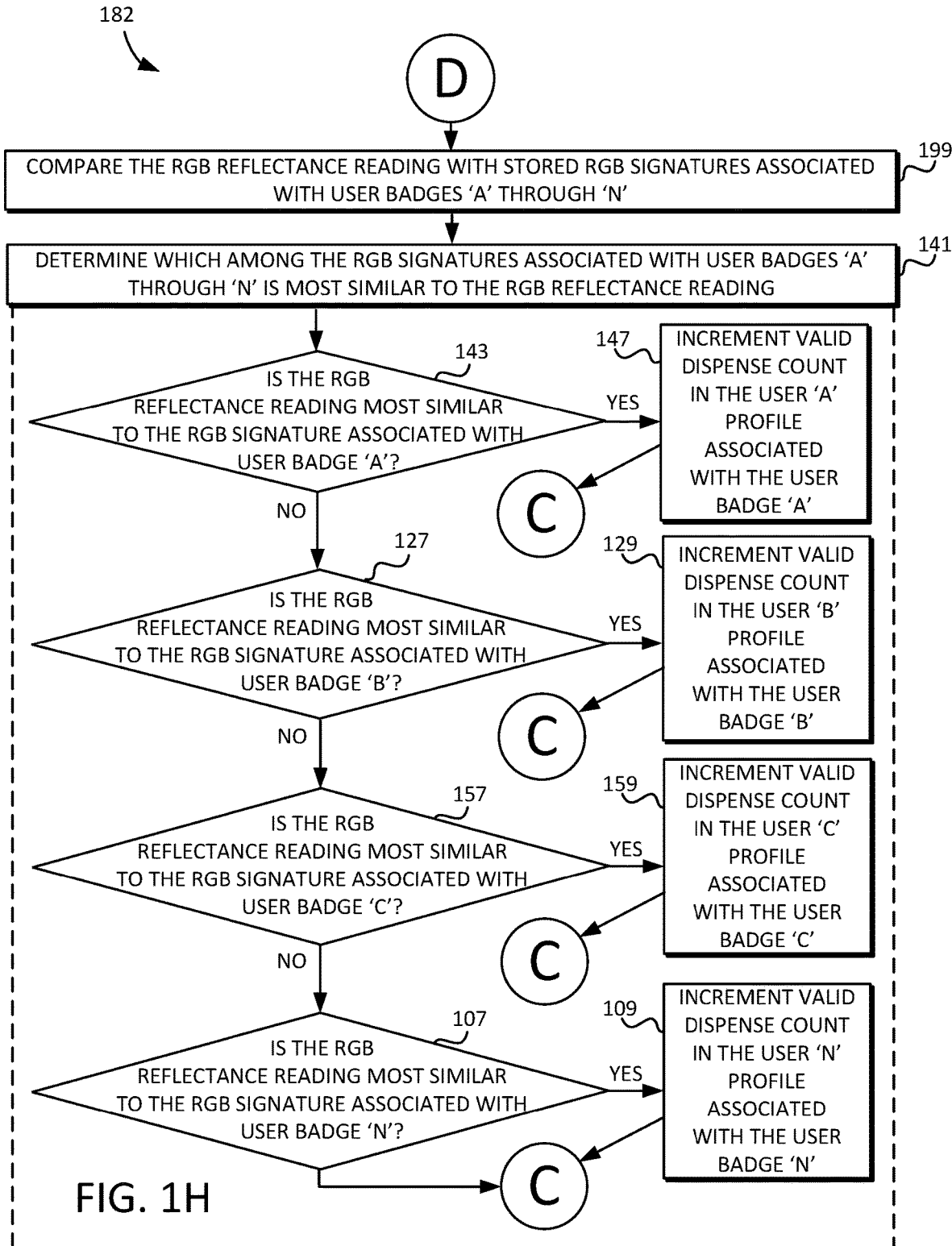

RETROFIT COMPLIANCE APPARATUS AND COMPLIANCE SYSTEM FOR HAND HYGIENE DISPENSERS

RELATED APPLICATION DATA

This application claims the benefit of U.S. Provisional Application Ser. No. 62/490,400, filed on Apr. 26, 2017, which is hereby incorporated by reference.

TECHNICAL FIELD

This application pertains to hand hygiene dispensers, and more particularly, to a retrofit compliance apparatus and compliance system for hand hygiene dispensers.

BACKGROUND

Every year millions of medical patients around the world acquire infections during their hospitalization. The World Health Organization (WHO) and the Center for Disease Control and Prevention (CDC) recognize lack of hand hygiene amongst healthcare workers as the primary cause of hospital-acquired infections. As a result of this, medical facilities around the world attempt to measure the hand hygiene compliance of their staff. Other industries such as the food, education and transportation sectors also attempt to measure hygiene dispenser usage.

Most industries currently measure hand hygiene through inaccurate means. Such conventional means include volumetric consumption over time or manual observation. The conventional techniques and devices all have drawbacks: some operate only with specific dispenser models, others require gross modifications in user workflow, others are highly inaccurate, while others provide no means for identifying the user responsible for dispenser use. Other deficiencies of conventional approaches include an inability to report that fluid was actually dispensed, an inability to determine if a hand was properly used to trigger the dispenser, an inability to determine whether a catch basin is full or near to capacity, an inability to provide usage feedback, and an inability to determine the identity of nearby people, among other disadvantages. In some cases, users may purposely position their hand sideways so that sanitizer solution is dispensed, but misses their hand. Such actions purposely circumvent compliance efforts and increase risks of infections.

The compliance problems are complicated by the many different soap and sanitizer dispenser models available on the market, none of which have the capability of providing true compliance with regulations. Accordingly, a need remains for an improved apparatus, system, and method for facilitating hand hygiene compliance measurement, increasing hand hygiene, and reducing healthcare facility-acquired infections. Embodiments of the inventive concept address these and other limitations in the prior art.

BRIEF DESCRIPTION OF THE DRAWINGS

FIGS. 1E through 1H illustrate a flow diagram showing an example operation of the hand hygiene compliance system of FIGS. 1B and 1C.

Figure 1A:
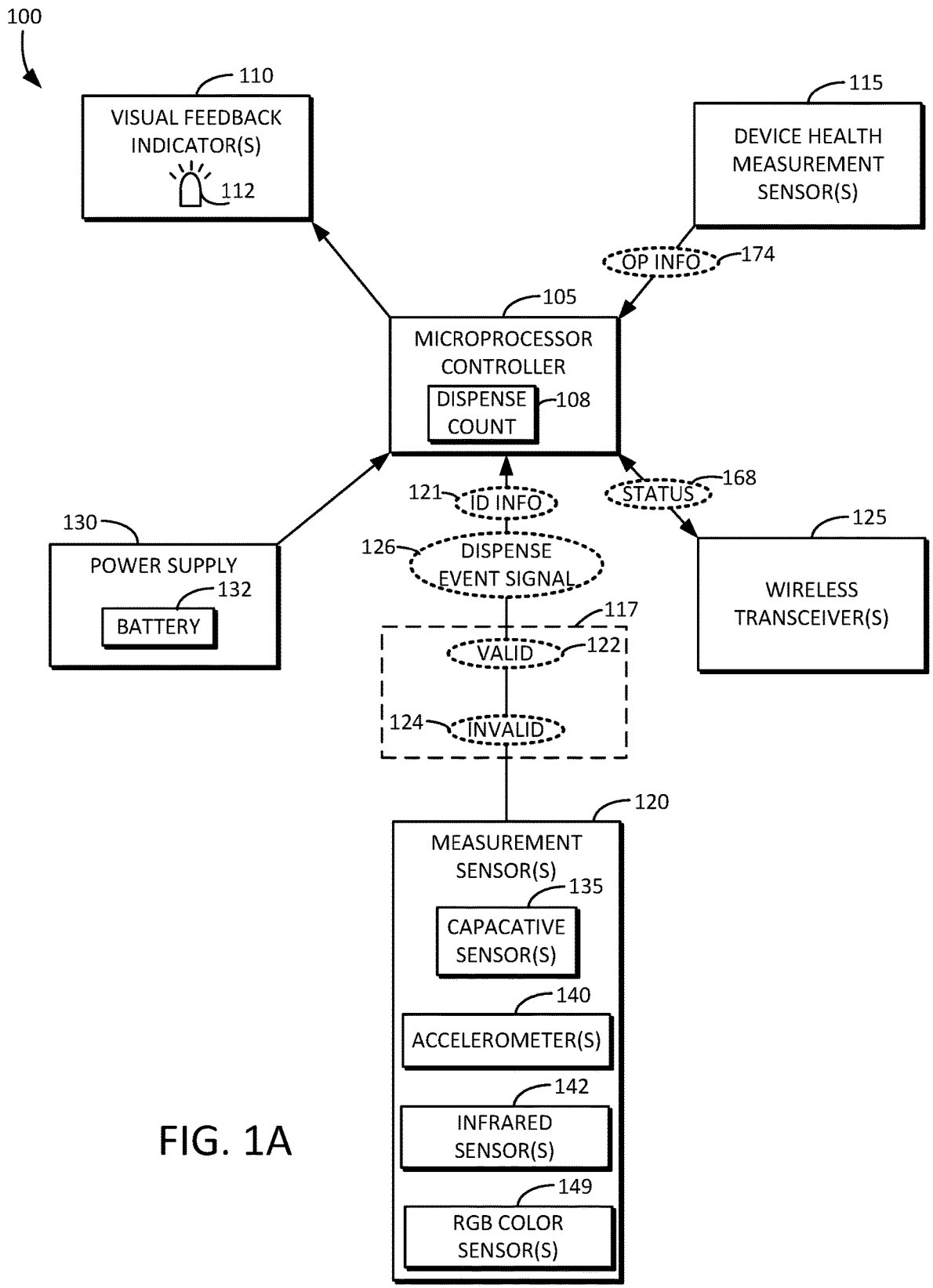
FIG. 1A illustrates a block diagram of an example retrofit compliance apparatus for a hand hygiene dispenser in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first sensor could be termed a second sensor, and, similarly, a second sensor could be termed a first sensor, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept include retrofit compliance apparatus, which can include a surface such as a catch basin or drip tray. The retrofit compliance apparatus can be used in conjunction with a hand hygiene dispenser, and monitor for compliant usage of the dispenser. The retrofit compliance apparatus can include one or more microcontrollers and one or more sensors. The retrofit compliance apparatus can detect whether the dispenser has been properly used. The retrofit compliance apparatus can collect data allowing the determination of the identity of who used the dispenser.

Embodiments of the present inventive concept provide a retrofit compliance apparatus, which can be attached to any pre-installed or newly-installed hand hygiene dispenser. The retrofit compliance apparatus disclosed herein provides an ability to detect its operational end of life and/or battery life. The retrofit compliance apparatus provides an ability to discern between ideal hand sanitation usage and non-ideal hand sanitation usage, and render a probability that fluid was actually received by a user of the dispenser. The retrofit compliance apparatus disclosed herein can detect whether a catch basin has reached a critical fluid mass, or alternatively, whether the catch basin has reached a critical level (i.e., not by mass). The retrofit compliance apparatus disclosed herein can estimate dispenser usage and provide battery life estimates of the dispenser. The retrofit compliance apparatus disclosed herein can detect when a catch basin sensor has fallen or has been removed, tampered with, and/or vandalized. The retrofit compliance apparatus disclosed herein can promote learning of users on proper hand hygiene fluid dispensing practices.

The retrofit compliance apparatus disclosed herein is backward compatible and works with existing dispensers, both manually operable dispensers or automatic dispensers. In some embodiments, the retrofit compliance apparatus is wall-attachable. The retrofit compliance apparatus disclosed herein works with existing installed dispensers, as an add-on attachment thereto, or as an add-on attachment proximately thereto. The retrofit compliance apparatus disclosed herein can detect dispense events associated with manually operated or automatic dispensers. The retrofit compliance apparatus disclosed herein can detect of the catch basin has reached a critical fluid mass or level, and can generate a warning. The retrofit compliance apparatus disclosed herein can detect, using an accelerometer or other means, whether a catch basin is moved, tampered with, or missing. The retrofit compliance apparatus disclosed herein provides feedback of usage, which can be used to improve compliance with state and federal health regulations.

The retrofit compliance apparatus can include a red green blue (RGB) color sensor designed to detect absorption and/or reflectance characteristics of the user's human hand that is engaging with the dispenser. By collecting user hand characteristics in dispense events where there is a relatively high certainty they are the true user (e.g., when their badge has a very high signal strength relative to any candidate badges), a server-side profile of each user's hand characteristics can be built up and maintained. When a dispense event occurs where signal strength or user position alone is not sufficient to differentiate between about 2 to 4 candidate users of a dispenser, the measured hand characteristic relative to each candidate user's hand characteristic profile can be used to further discriminate and ensure a high accuracy of dispenser credit attribution. An RGB color sensor is one example of a sensor that can be used to detect hand characteristics and create a profile of user hands. Other types of sensors can include a camera, an infra-red sensor, a gesture sensor, or the like.

Figure 1B:
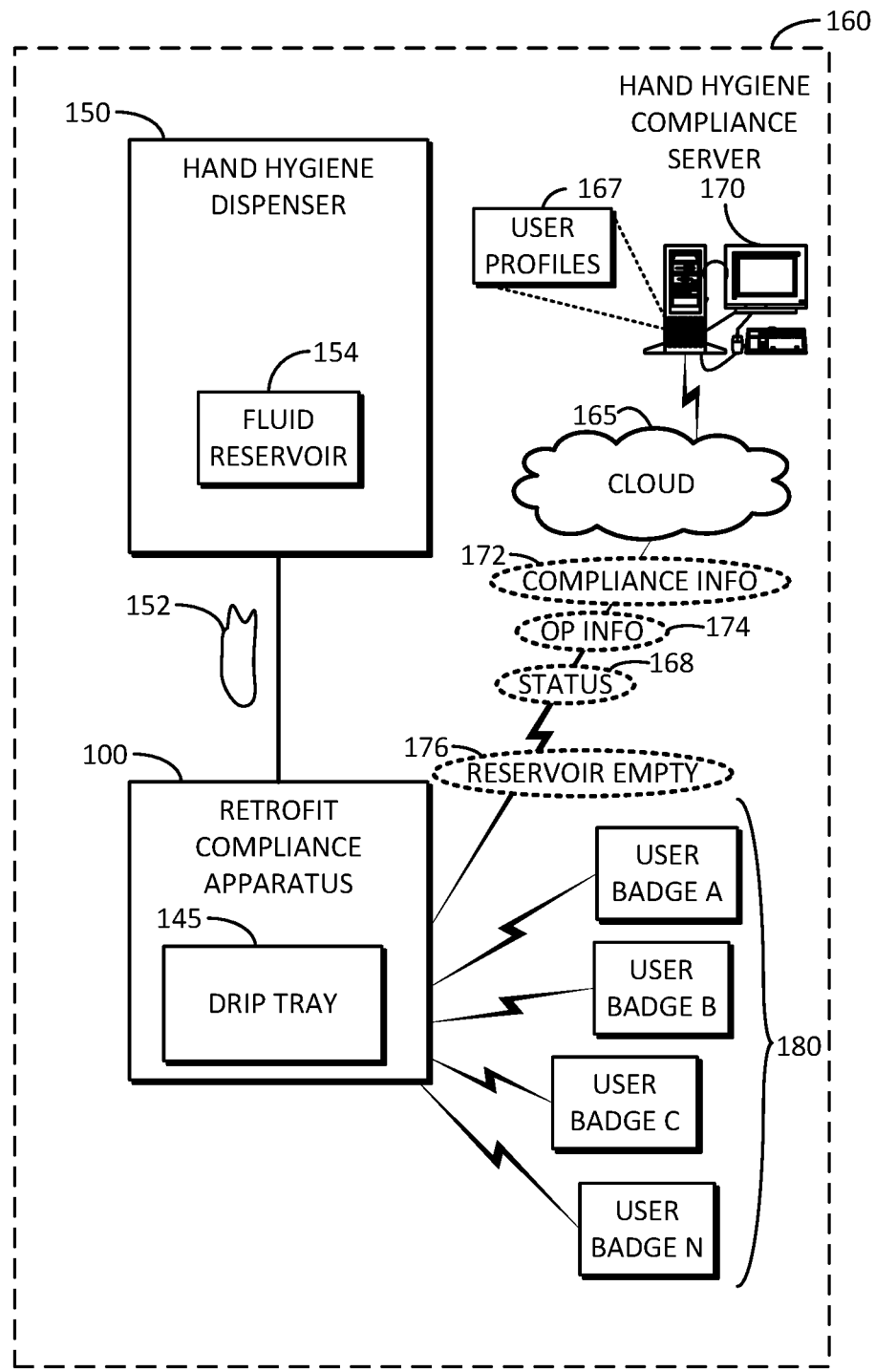
FIG. 1B illustrates a block diagram of the example retrofit compliance apparatus of FIG. 1A attached to a hand hygiene dispenser, and a hand hygiene compliance system, in accordance with various embodiments of the present inventive concept.
Figure 1C:
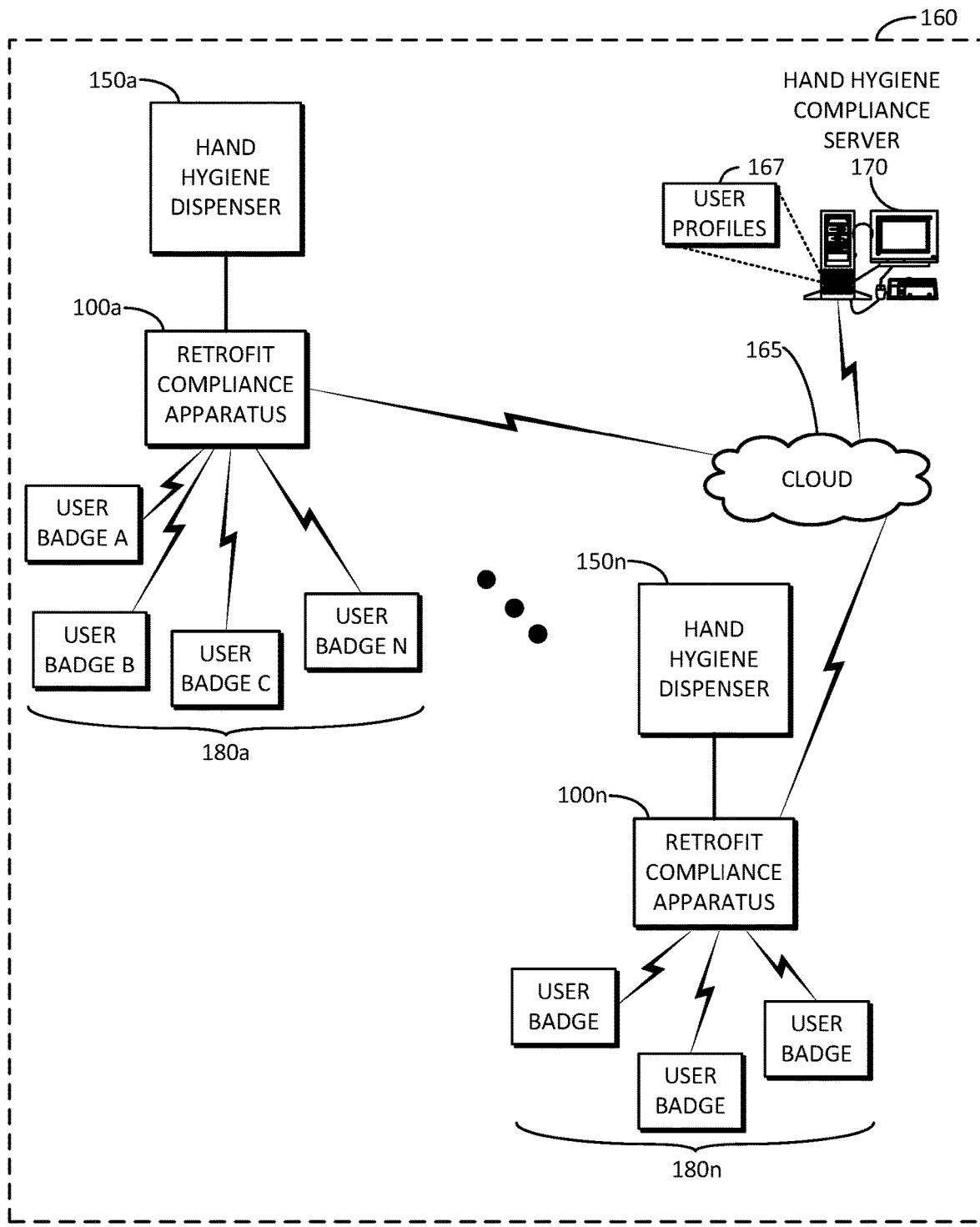
FIG. 1C illustrates additional details of the hand hygiene compliance system of FIG. 1B, in accordance with various embodiments of the present inventive concept.

FIG. 1A illustrates a block diagram of an example retrofit compliance apparatus 100 for a hand hygiene dispenser in accordance with various embodiments of the present inventive concept. FIG. 1B illustrates a block diagram of the example retrofit compliance apparatus 100 of FIG. 1A attached to a hand hygiene dispenser 150, included in a hand hygiene compliance system 160, in accordance with various embodiments of the present inventive concept. FIG. 1C illustrates additional details of the hand hygiene compliance system 160 of FIG. 1B, in accordance with various embodiments of the present inventive concept. Reference is now made to FIGS. 1A through 1C.

The retrofit compliance apparatus 100 can include a controller 105. The controller 105 can be a microprocessor, for example. The retrofit compliance apparatus 100 can further include one or more visual feedback indicators 110 coupled to the controller 105, one or more device health measurement sensors 115 coupled to the controller 105, one or more measurement sensors 120 coupled to the controller 105, one or more wireless transceivers 125 coupled to the controller 105, and/or a power supply 130 to supply power to the controller 105. The power supply 130 can include, for example, a battery 132. Alternatively, the power supply 130 can derive power from the power mains.

The controller 105 can receive operational information 174 from the one or more measurement sensors 120 and the one or more device health measurement sensors 115. The controller 105 can cause the one or more visual feedback indicators 110 to provide feedback to the user of the dispenser 150 (of FIG. 1B). The visual feedback indicators 110 can include, for example, a light emitting diode (LED) 112.

The one or more device health measurement sensors 115 can monitor the health of the retrofit compliance apparatus 100. For example, the one or more device health measurement sensors 115 can detect when the battery 132 in the power supply 130 is running low, and can notify the controller 105, which can transmit such a status 168 using the one or more wireless transceivers 125, and/or via the cloud 165 (of FIG. 1B). The one or more device health measurement sensors 115 can also detect whether the retrofit compliance apparatus 100 is functioning properly, or has otherwise experienced an error condition, and can notify the controller 105, which can transmit such a status 168 using the one or more wireless transceivers 125, and/or via the cloud 165.

The one or more measurement sensors 120 can include one or more capacitive sensors 135. The capacitive sensors 135 can include one or more capacitive sensing electrodes. The capacitive sensors 135 can detect a hand signal near the retrofit compliance apparatus 100. The capacitive sensors 135 can sense capacitive fluctuations 117, and provide the gathered capacitive fluctuation data 117 to the micro-controller unit 105. The controller 105 can receive the capacitive fluctuation data 117 from the one or more measurement sensors 120. The controller 105 can make a determination whether the capacitive fluctuations 117 indicate a valid hand signal 122 or an invalid hand signal 124. Alternatively or in addition, the controller 105 can cause the gathered data to be transmitted to a remote server 170 (of FIG. 1B) via the cloud 165 using the one or more wireless transceivers 125, where the determination of validity of the hand signal can be determined remotely. Alternative measurement sensors can include one or more infrared sensors 142, one or more red green blue (RGB) color sensors 149, or other suitable means of detecting the presence of a hand and the activation of an associated dispenser. The one or more measurement sensors 120 can generate and send a dispense event signal to the controller 105, which can maintain a dispense count 108, as further described below.

The one or more measurement sensors 120 can include one or more accelerometers 140. The one or more accelerometers 140 can detect movement of the retrofit compliance apparatus 100. The one or more accelerometers 140 can detect whether the retrofit compliance apparatus 100 has fallen or is being tampered with, moved, removed, relocated, vandalized, or the like. The controller 105 can communicate with the one or more accelerometers 140, make such a determination (e.g., status 168), and transmit such a determination to the remote server 170 using the one or more wireless transceivers 125, and/or via the cloud 165.

The retrofit compliance apparatus 100 can include a surface such as a drip tray 145 (FIG. 1B), which can catch sanitizer fluid 152 that is not delivered to the hands of a user. The one or more measurement sensors 120 can include other suitable sensors to determine that the sanitizer fluid 152 was actually dispensed. Alternatively or in addition, the one or more measurement sensors 120 can determine whether the drip tray 145 is full or near to capacity with the sanitizer fluid 152. The one or more measurement sensors 120 can determine the identity of badges 180 of nearby users, and determine a likelihood that a particular user used the hand hygiene dispenser 150. The user-assigned badges 180 can each be equipped with wireless transmitters capable of communicating with the one or more wireless transceivers 125 of the retrofit apparatus 100. The one or more measurement sensors 120 can send the dispense event signal 126 to the controller 105, and the controller 105 can determine the dispense count 108, or in other words, the number of times a dispense event has occurred. The controller 105 can therefore make a determination whether a fluid reservoir 154 of the dispenser 150 is empty or near empty, and send a reservoir empty message 176 or warning to that effect. In some embodiments, a user may indicate through the one or more measurement sensors 120 or the one or more wireless transceivers 125 that the fluid reservoir 154 of the dispenser 150 has been refilled or replaced. This combined with knowledge stored in the cloud 165 regarding the volume of the fluid reservoir 154, the volume per dispenser 150, and/or the dispense count 108 since replacement, can provide a more accurate determination of whether the fluid reservoir 154 of the dispenser 150 is empty or near empty, and send a more accurate warning 176 to that effect. Moreover, the one or more measurement sensors 120 can send user identifying information 121 to the controller 105, and the controller 105 can identify a particular user that used the dispenser 150 from among multiple different users.

The hand hygiene compliance system 160 can include the hand hygiene dispenser 150, the retrofit apparatus 100, the drip tray 145, the network such as the cloud 165, and/or a remote server 170. The retrofit compliance apparatus 100 can transmit the status 168, compliance information 172, a reservoir empty message 176, and/or other operational information 174 to the remote server 170 via the cloud 165. Multiple hand hygiene dispensers (e.g., 150a through 150n of FIG. 1C) associated with multiple retrofit apparatuses (e.g., 100a through 100n of FIG. 1C) can each communicate via the cloud 165 with the remote server 170, thereby providing a comprehensive view of compliance for a particular location such as a hospital. Different user badges (e.g., 180a and 180n of FIG. 1C) can be detected to be nearby different retrofit apparatuses (e.g., 100a and 100b of FIG. 1C). The hand hygiene compliance server 170 can store and update user profiles 167 as shown in FIGS. 1B and 1C. The user profiles 167 can be updated based on the information gathered by the retrofit compliance apparatus 100. The user profiles 167 are described in further detail below.

Figure 1D:
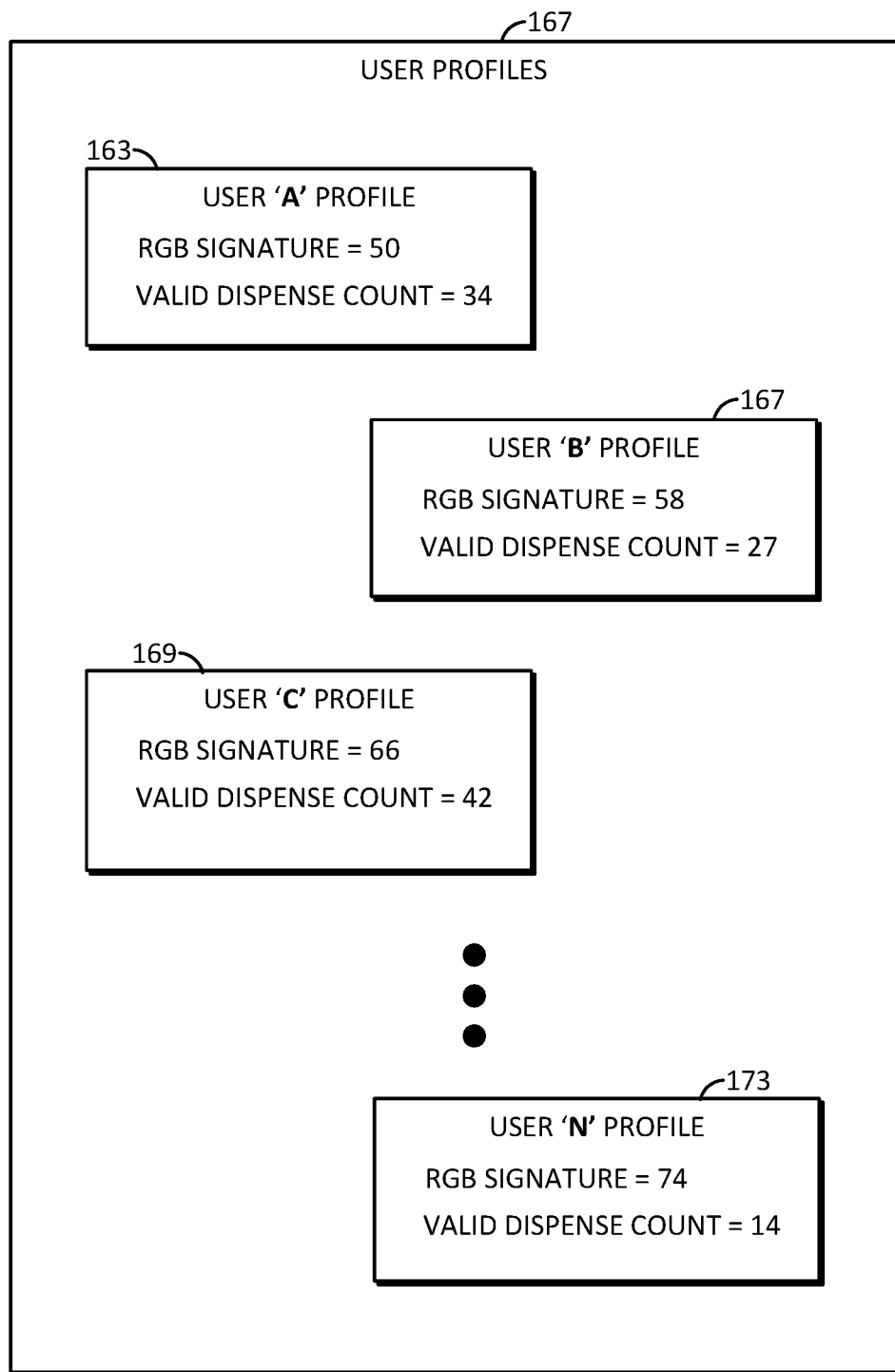
FIG. 1D illustrates additional details of the user profiles stored in the remote server of FIGS. 1B and 1C, in accordance with various embodiments of the present inventive concept.

FIG. 1D illustrates additional details of the user profiles 167 stored in the remote server 170 of FIGS. 1B and 1C, in accordance with various embodiments of the present inventive concept. The user profiles 167 can include individual user profiles (e.g., user 'A' profile 163, user 'B' profile 167, user 'C' profile 169, through user 'N' profile 173) for various users of the hand hygiene compliance system 160. Each of the user profiles (e.g., 163, 167, 169, and 173) can include an RGB signature, and a valid dispense count. The RGB signature is a digital representation of an RGB reflectance reading that serves as a signature or identifier of a user's human hand. The remote server 170 can receive RGB reflectance readings from the retrofit compliance apparatus 100. While the user profiles 167 show example values for the RGB signatures, it will be understood that these are illustrative, and such values can vary depending on the hygiene diligence of the various users.

The valid dispense count represents the number of times that the particular user properly performed a valid dispense action of the hand hygiene dispenser 150a. For example, when the controller 105 (of FIG. 1A) of the retrofit compliance apparatus 100 (of FIG. 1A) makes a determination that the capacitive fluctuations and/or the RGB reflective reading indicate a valid hand signal 122 (of FIG. 1A) for a particular user, then the hand hygiene compliance server 170 can cause the valid dispense count to be incremented for that particular user.

FIGS. 1E through 1H illustrate a flow diagram 182 showing an example operation of the hand hygiene compliance system 160 of FIGS. 1B and 1C. The steps shown in the flow diagrams herein need not be performed in the order shown. Rather, the steps may be performed in a different order, or with intervening steps, without departing from the inventive concepts disclosed herein. Reference is now made to FIGS. 1A through 1H.

At 183, a user badge that is worn by an initially unknown user can activate a hand hygiene dispenser 150 when other candidate badges are relatively far away from the dispenser 150. At 123, a determination can be made whether a valid hand signal (e.g., 122 of FIG. 1A) is associated with the activation of the hand hygiene dispenser 150. If NO, then the flow can loop back through circle C back to step 183. Otherwise, if YES, meaning a valid hand signal, then the flow can proceed to 184.

In this scenario, at 184, the retrofit compliance apparatus 100 can measure the received signal strength indicator (RSSI) of all candidate badges (e.g., candidate badges 'A' through 'N'). At 185, the retrofit compliance apparatus 100 can measure the RGB reflectance reading of a human hand associated with the initially unknown user. At 186, the microprocessor controller 105 of the retrofit compliance apparatus 100 and/or the remote server 170 can predict a relative physical distance between the user badge 'A' and each of the other candidate badges 'B' through 'N' by comparing the RSSI of each candidate, as further shown at 187, 188, and 189.

At 187, a determination can be made whether an absolute difference between the RSSI of the user badge 'A' and the RSSI of the user badge 'B' is greater than a predefined threshold. It will be understood that in an alternate embodiment this and other similar comparisons described herein may include a greater than or equal to operation. By way of example, assuming that the predefined RSSI threshold is 20, when the absolute difference, i.e., |RSSI of the user badge 'A' minus the RSSI of the user badge 'B'| is greater than 20, then it is likely that the user 'B' wearing the user badge 'B' is not in close proximity to the user 'A' wearing the user badge 'A'. Therefore, the flow would proceed from 187 to the next determination at 188. Otherwise, the flow would go through circle B and jump over to FIG. 1G.

At 188 in FIG. 1E, a determination can be made whether an absolute difference between the RSSI of the user badge 'A' and the RSSI of the user badge 'C' is greater than the predefined threshold. By way of example, assuming that the predefined RSSI threshold is 20, when the absolute difference, i.e., |RSSI of the user badge 'A' minus the RSSI of the user badge 'C'| is greater than 20, then it is likely that the user 'C' wearing the user badge 'C' is not in close proximity to the user 'A' wearing the user badge 'A'. Therefore, the flow would proceed from 188 to the next determination at 189. Otherwise, the flow would go through circle B and jump over to FIG. 1G.

At 189 in FIG. 1E, a determination can be made whether an absolute difference between the RSSI of the user badge 'A' and the RSSI of the user badge 'N' is greater than the predefined threshold. By way of example, assuming that the predefined RSSI threshold is 20, when the absolute difference, i.e., |RSSI of the user badge 'A' minus the RSSI of the user badge 'N'| is greater than 20, then it is likely that the user 'N' wearing the user badge 'N' is not in close proximity to the user 'A' wearing the user badge 'A'. Therefore, the flow would proceed through circle A and onto FIG. 1F. Otherwise, the flow would go through circle B and jump over to FIG. 1G.

Figure 1F:
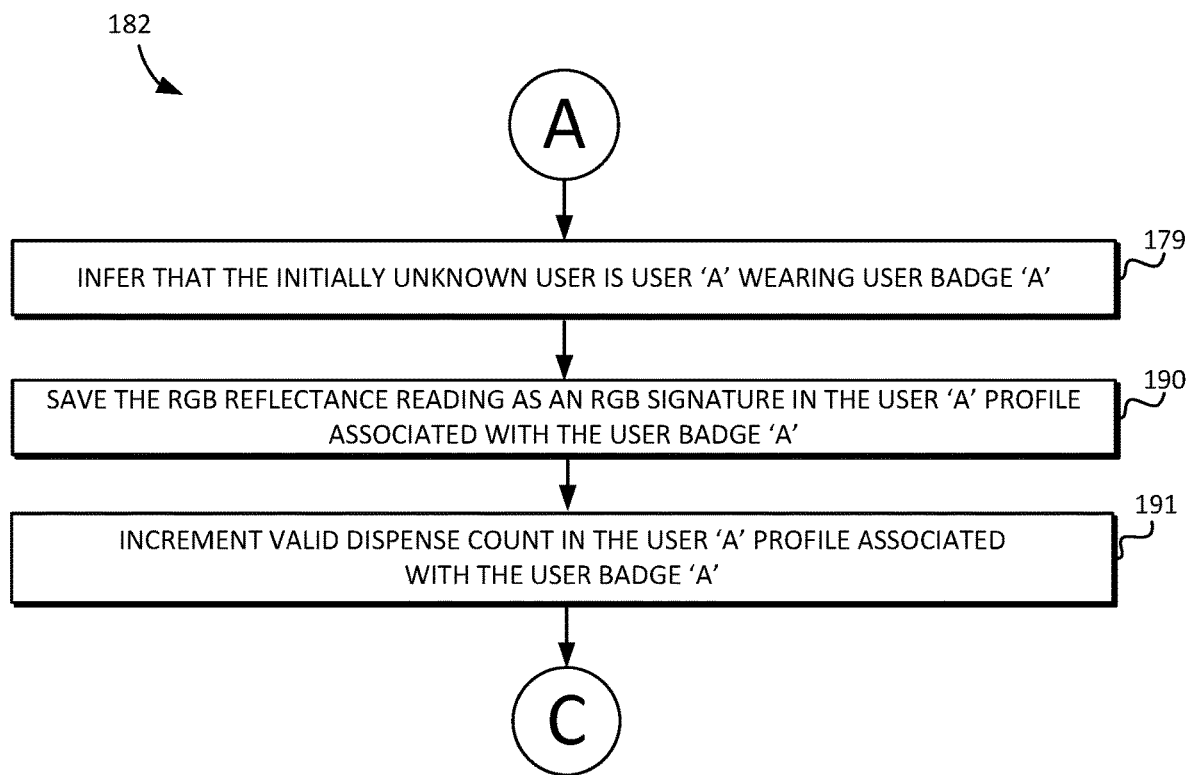

When each of the determinations made at 187, 188, and 189 are in the affirmative, then the flow proceeds through circle A and onto FIG. 1F. In FIG. 1F, at 179, an inference can be made based on the outcome of steps 187, 188, and 189 that the initially unknown user is actually user 'A' wearing the user badge 'A'. At 190, the RGB reflectance reading can be saved as an RGB signature in the user 'A' profile (e.g., 163 of FIG. 1D) associated with the user badge 'A'. At 191, the valid dispense count can be incremented in the user 'A' profile (e.g., 163 of FIG. 1D) associated with the user badge 'A'. The flow can then proceed through circle C back over to FIG. 1E. It will be understood that while user 'A' was selected in this example to be the actual user that used the dispenser, steps 187, 188, and 189 can be repeated for each other user (e.g., users 'B' through 'N') if necessary to determine the actual user that used the dispenser.

Figure 1G:
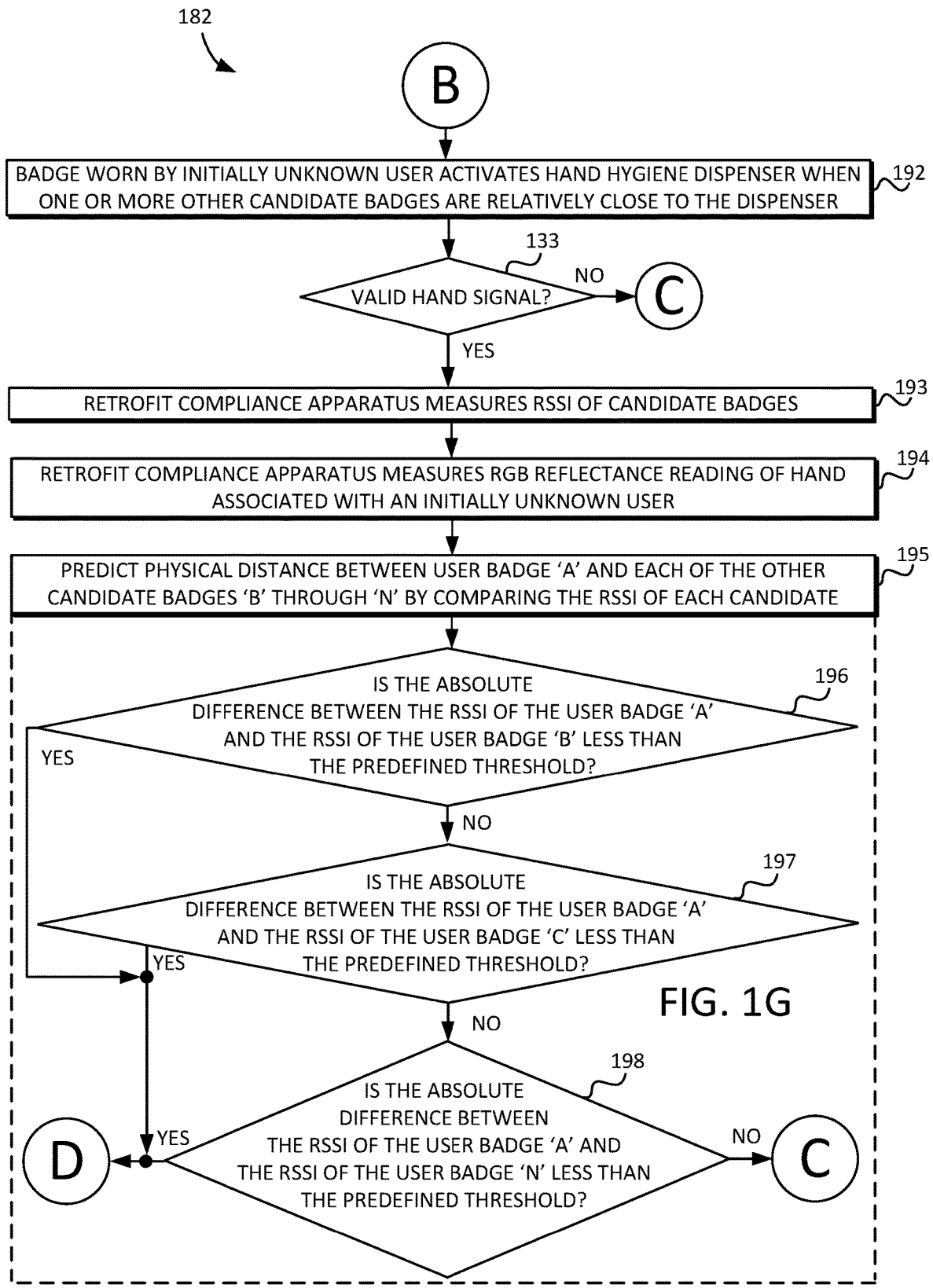

Referring now to FIG. 1G, at 192, a user badge that is worn by an initially unknown user can activate a hand hygiene dispenser 150 when one or more other candidate badges are relatively close to the dispenser 150. At 133, a determination can be made whether a valid hand signal (e.g., 122 of FIG. 1A) is associated with the activation of the hand hygiene dispenser 150. If NO, then the flow can loop back through circle C back to step 183. Otherwise, if YES, meaning a valid hand signal, then the flow can proceed to 193.

In this scenario, at 193, the retrofit compliance apparatus 100 can measure the RSSI of all candidate badges (e.g., candidate badges 'A' through 'N'). At 194, the retrofit compliance apparatus 100 can measure the RGB reflectance reading of a human hand associated with the initially unknown user. At 195, the microprocessor controller 105 of the retrofit compliance apparatus 100 and/or the remote server 170 can predict a relative physical distance between the user badge 'A' and each of the other candidate badges 'B' through 'N' by comparing the RSSI of each candidate, as further shown at 196, 197, and 198.

At 196, a determination can be made whether an absolute difference between the RSSI of the user badge 'A' and the RSSI of the user badge 'B' is less than a predefined threshold. It will be understood that in an alternate embodiment this and other similar comparisons described herein may include a less than or equal to operation. By way of example, assuming that the predefined RSSI threshold is 20, when the absolute difference, i.e., |RSSI of the user badge 'A' minus the RSSI of the user badge 'B'| is less than 20, then it is likely that the user 'B' wearing the user badge 'B' is in close proximity to the user 'A' wearing the user badge 'A'. Therefore, the flow would go through circle D and jump over to FIG. 1H. Otherwise, the flow would proceed from 196 to the next determination at 197.

At 197 in FIG. 1G, a determination can be made whether an absolute difference between the RSSI of the user badge 'A' and the RSSI of the user badge 'C' is less than the predefined threshold. By way of example, assuming that the predefined RSSI threshold is 20, when the absolute difference, i.e., |RSSI of the user badge 'A' minus the RSSI of the user badge 'C'| is less than 20, then it is likely that the user 'C' wearing the user badge 'C' is in close proximity to the user 'A' wearing the user badge 'A'. Therefore, the flow would go through circle D and jump over to FIG. 1H. Otherwise, the flow would proceed from 197 to the next determination at 198.

At 198 in FIG. 1G, a determination can be made whether an absolute difference between the RSSI of the user badge 'A' and the RSSI of the user badge 'N' is less than the predefined threshold. By way of example, assuming that the predefined RSSI threshold is 20, when the absolute difference, i.e., |RSSI of the user badge 'A' minus the RSSI of the user badge 'N'| is less than 20, then it is likely that the user 'N' wearing the user badge 'N' is in close proximity to the user 'A' wearing the user badge 'A'. Therefore, the flow would go through circle D and jump over to FIG. 1H. Otherwise, the flow would proceed through circle C back to FIG. 1E.

When each of the determinations made at 196, 197, and 198 are in the affirmative, then the flow proceeds through circle D and onto FIG. 1H. In FIG. 1H, at 199, the RGB reflectance reading can be saved as an RGB signature in the user 'A' profile (e.g., 163 of FIG. 1D) associated with the user badge 'A'. At 141, a determination can be made which among the RGB signatures associated with the user badges 'A' through 'N' is most similar to the RGB reflective reading.

At 143, if the determination is made that the RGB reflective reading is most similar to the RGB signature associated with user badge 'A', then the flow proceeds to 147 where the valid dispense count can be incremented in the user 'A' profile (e.g., 163 of FIG. 1D) associated with the user badge 'A'. The flow can then proceed through circle C back over to FIG. 1E. Otherwise, if the determination made at 143 is NO, then the flow can proceed to 127, where if the determination is made that the RGB reflective reading is most similar to the RGB signature associated with user badge 'B', then the flow proceeds to 129 where the valid dispense count can be incremented in the user 'B' profile (e.g., 167 of FIG. 1D) associated with the user badge 'A'. The flow can then proceed through circle C back over to FIG. 1E. Otherwise, if the determination made at 127 is NO, then the flow can proceed to 157, where if the determination is made that the RGB reflective reading is most similar to the RGB signature associated with user badge 'C', then the flow proceeds to 159 where the valid dispense count can be incremented in the user 'C' profile (e.g., 169 of FIG. 1D) associated with the user badge 'C'. The flow can then proceed through circle C back over to FIG. 1E. Otherwise, if the determination made at 157 is NO, then the flow can proceed to 107, where if the determination is made that the RGB reflective reading is most similar to the RGB signature associated with user badge 'N', then the flow proceeds to 109 where the valid dispense count can be incremented in the user 'N' profile (e.g., 173 of FIG. 1D) associated with the user badge 'N'. The flow can then proceed through circle C back over to FIG. 1E.

Referring back to the determination made at 107, if that determination is NO, meaning that the RGB reflectance reading is not most similar to the RGB signature associated with the user badge 'N', then the flow can proceed directly through circle C back over to FIG. 1E.

Figure 2:
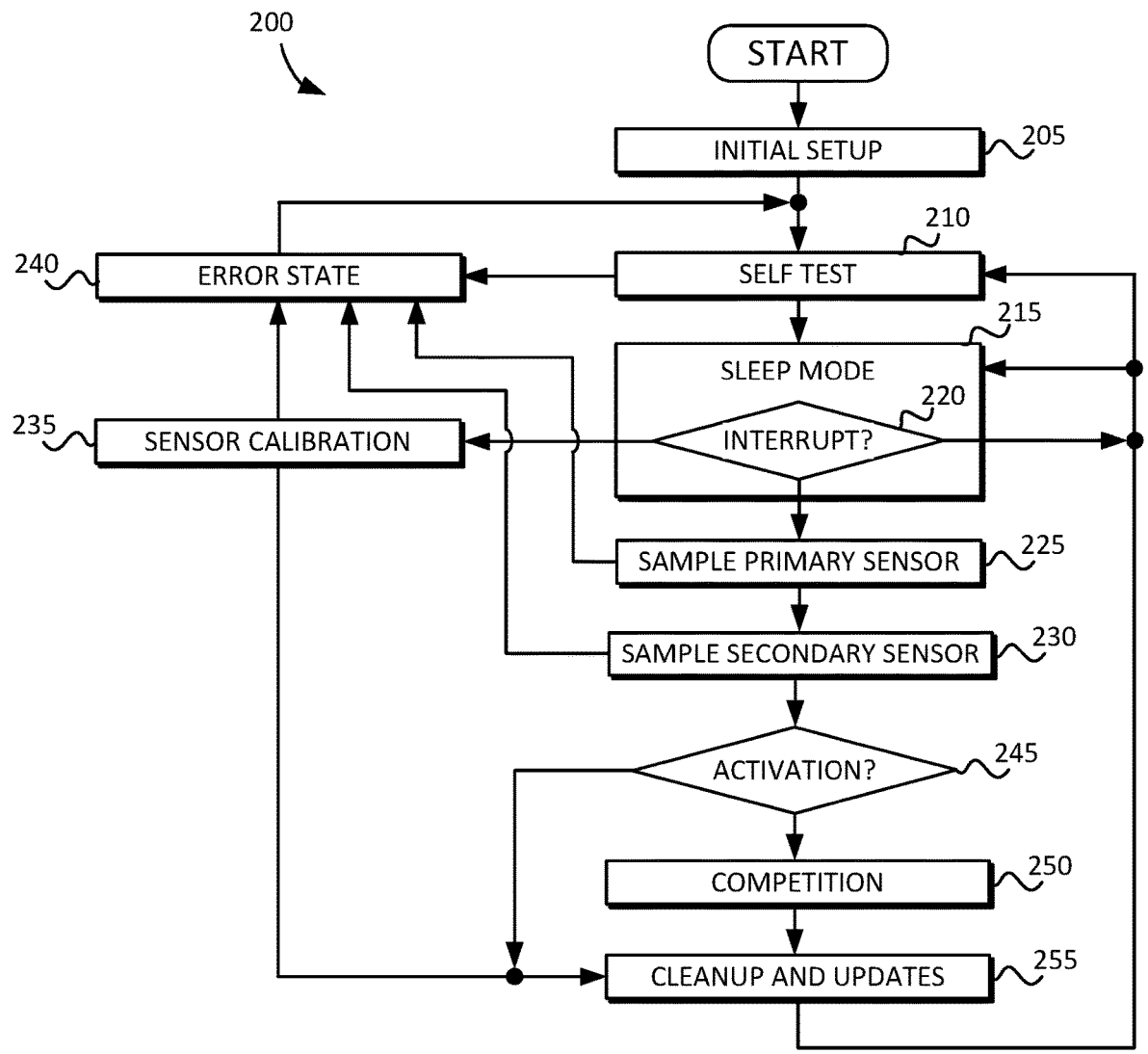
FIG. 2 is a flow diagram illustrating an example operation of the retrofit compliance apparatus of FIG. 1A.

FIG. 2 is a flow diagram 200 illustrating an example operation of the retrofit compliance apparatus of FIG. 1A. The technique can begin at 205 in which an initial setup is performed. At 210, a self test can be performed, for example, by the controller 105. The self test can include a sensor communication, a wizard or staff orientation, a sub system communication, a verification that electronic noise levels are acceptable, a verification of sensor threshold versus calculated threshold is within a predefined criteria, or the like.

When the self test fails, the flow can enter an error state at 240. In the error state 240, a visual indicator of the error may be display, for example, using the one or more visual feedback indicators 110 such as an LED. A power-on reset may cause the retrofit compliance apparatus 100 to return to the self test at 210 from the error state 240. When the self test passes, the flow proceeds to 215 in which a sleep mode is entered.

During the sleep mode 215, an interrupt 220 may occur. The interrupt 220 may be one of a variety of interrupts. For example, when the interrupt 220 is an hourly interrupt, the flow proceeds to a sensor calibration at 235. In other words, a sensor calibration can be performed every hour. The hourly interrupt may be dependent on a real-time clock (RTC). When the sensor calibration 235 passes, the flow proceeds to 255 in which cleanup and updates can be performed, and then back to either the self test at 210 or the sleep mode at 215. Otherwise, if the sensor calibration 235 does not pass, the flow proceeds to the error state 240. By way of another example, when the interrupt 220 is a daily interrupt, the flow reverts back to the self test 210. In other words, the self test 210 can be automatically performed at least once per day. The daily interrupt may be dependent on a real-time clock (RTC). By way of yet another example, when the interrupt 220 is a primary sensor interrupt, the flow can proceed to 225 in which a primary sensor of the retrofit compliance apparatus 100 can be sampled.

When the primary sensor sampling at 225 is successful, the flow proceeds to 230 in which a secondary sensor is sampled. Otherwise, if the primary sensor sampling at 225 is unsuccessful, the flow proceeds to the error state 240. When the secondary sensor sampling at 230 is successful, the flow proceeds to 245. Otherwise, if the secondary sensor sampling at 230 is unsuccessful, the flow proceeds to the error state 240.

Figure 3:
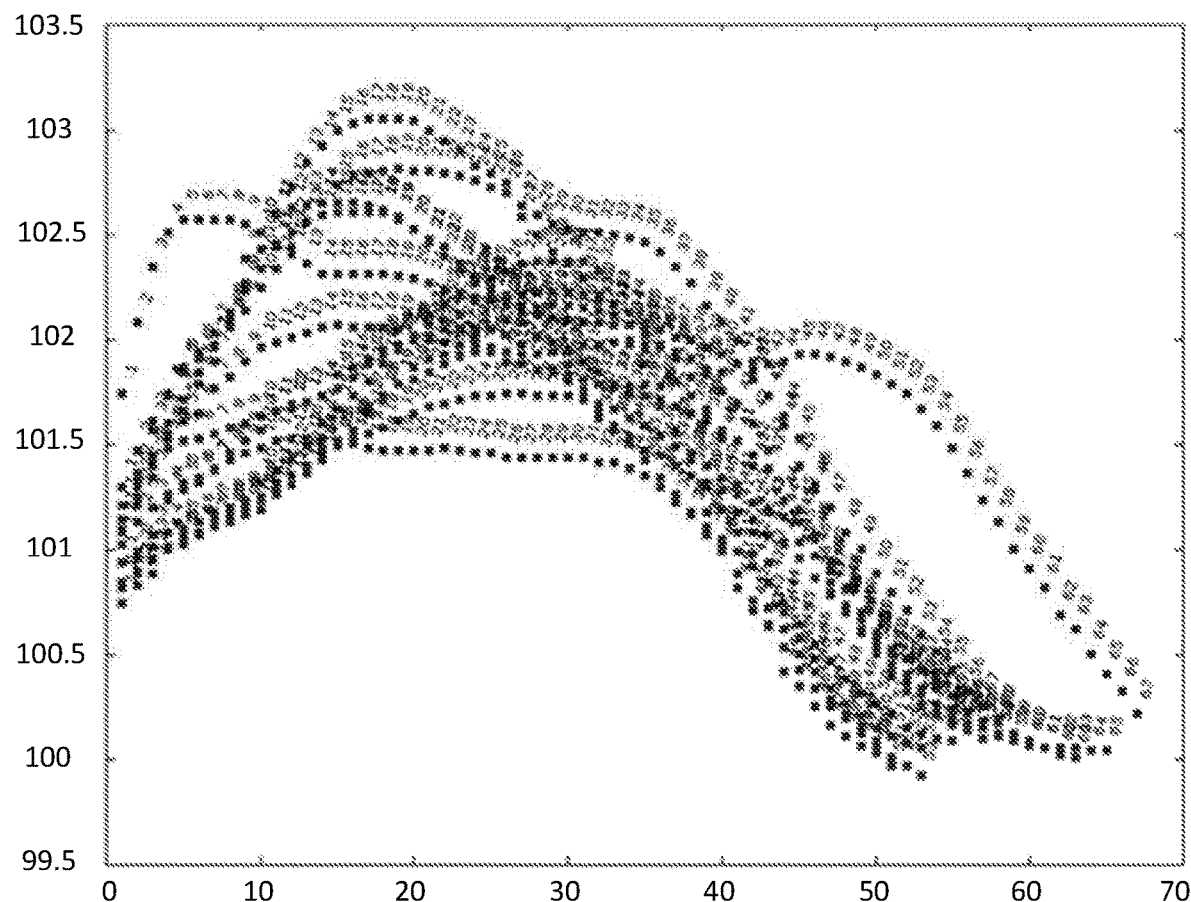
FIG. 3 illustrates a graph showing a valid hand activation signal based on a measured capacitance in accordance with various embodiments of the present inventive concept.

At 245, a determination can be made whether an activation has occurred based on the measurements made by the capacitive sensor, as described in detail above with reference to FIG. 3. If YES, meaning an activation has occurred, the flow can proceed to 250 in which a competition is performed to determine which user is most likely to have activated the dispenser. This competition can take the form of measuring the received signal strength of user-assigned badges 180 equipped with wireless transmitters capable of communicating with the one or more wireless transceivers 125 of the retrofit apparatus 100. Based on the highest signal strength or other user-associated information, a determination can be made of the user most likely to have activated the dispenser 150. This determination can either be made by logic associated with the controller 150 of the retrofit apparatus 100, the user badge 180 or on the information stored in the cloud. Otherwise, if NO, meaning an activation has not occurred, the flow can proceed to 255 for cleanup and updates. At 250, when a timeout or successful communication has been completed, the flow can proceed to 255 for cleanup and updates.

From the cleanup and updates state at 255, the flow can proceed to either the sleep mode 215 or the self test at 210 if indicated by a real-time clock (RTC), for further processing. The cleanup and updates 255 can include counter updates, settings updates, or the like.

Figure 4:
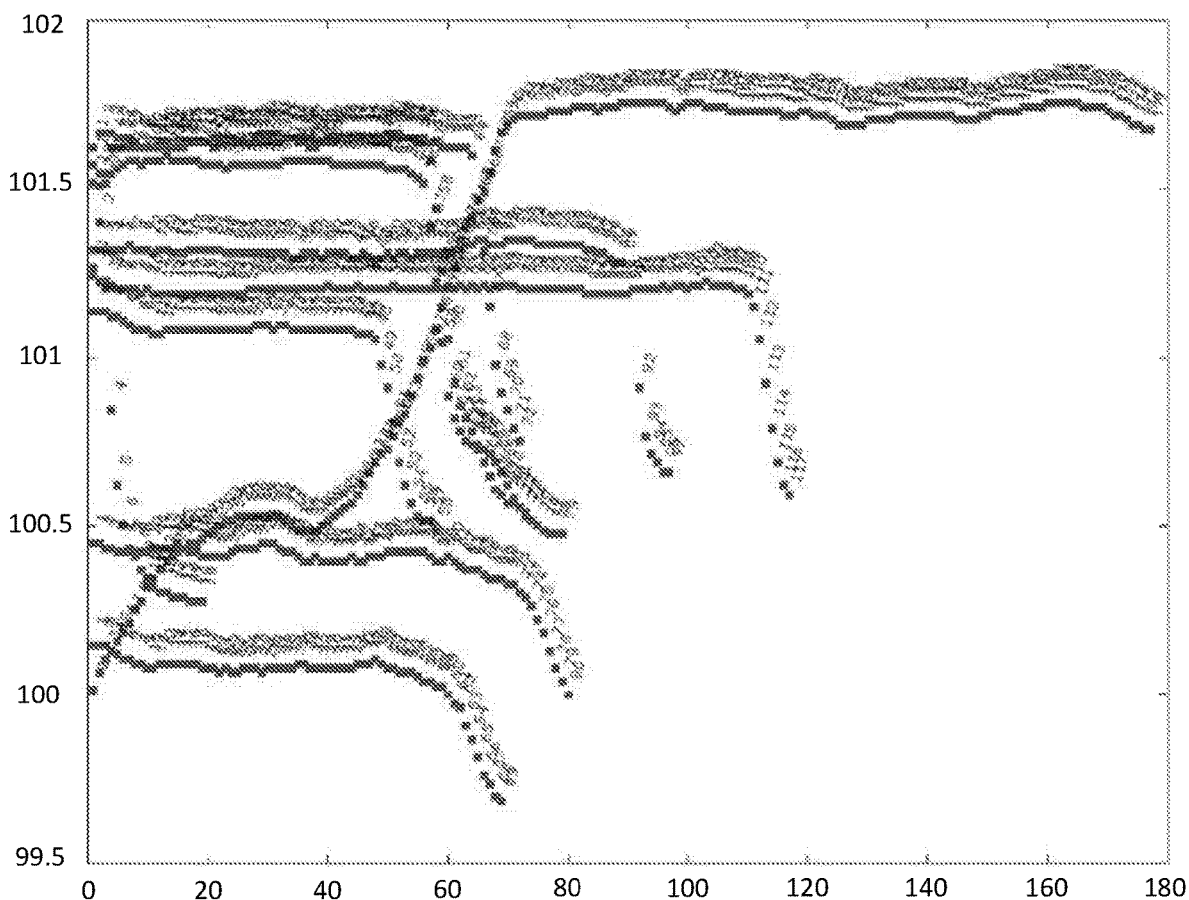
FIG. 4 illustrates a graph showing an invalid hand activation signal based on a measured capacitance in accordance with various embodiments of the present inventive concept.

FIG. 3 illustrates a graph showing an example valid hand activation signal (e.g., 122) based on a measured capacitance in accordance with various embodiments of the present inventive concept. FIG. 4 illustrates a graph showing an example invalid hand activation signal (e.g., 124) based on a measured capacitance in accordance with various embodiments of the present inventive concept. Reference is now made to FIGS. 3 and 4.

The one or more capacitive sensors 135 of the retrofit compliance apparatus 100 can sense capacitive fluctuations, and provide the gathered data to the controller 105. The controller 105 can make a determination whether the capacitive fluctuations indicate a valid hand signal, as shown by the example graph in FIG. 3, or whether the capacitive fluctuations indicate an invalid hand signal, as shown by the example graph in FIG. 4. Alternatively or in addition, the controller 105 can cause the gathered data to be transmitted via the cloud 165 to a remote server 170 for the determination to be made remotely. Accordingly, the hand hygiene compliance system 160 can determine whether a user is properly placing their hand under the hand hygiene dispenser 150 and catching the sanitizer fluid as it exits the dispenser 150, or whether the user is attempting to circumvent the compliance system 160 by holding the hand in a vertical orientation so that the sanitizer fluid passes by the user's hand without being collected within the user's hand. When the hand hygiene compliance system 160 detects such attempts at circumventing compliance, upper management of organizations can be notified. For example, hospital managers such as compliance officers can be notified of attempts at circumvention by the hospital employees. Individual employees can be identified as ones who have attempted or succeeded in circumventing the compliance system 160 by detection the proximity of particular employee badges 180 during the circumvention attempts.

Reference is now made to FIGS. 1A through 4.

In some embodiments, a retrofit hand hygiene compliance apparatus 100 includes a drip tray 145 configured to catch fluid 152 dispensed from a hand hygiene dispenser 150. One or more sensors 120 are configured to detect usage of the dispenser 150, and to produce a dispense event signal 126. One or more microcontrollers 105 are configured to receive the dispense event signal 126 from the one or more sensors 120, and to process the dispense event signal 126 so that a determination can be made whether or not the dispenser 150 has been used.

In some embodiments, the one or more sensors 120 are configured to detect user identifying information 121. The one or more microcontrollers 105 can receive the user identifying information 121 from the one or more sensors 120. The one or more microcontrollers 105 can process the user identifying information 121 so that a determination can be made regarding an identity of a user that used the dispenser 150.

In some embodiments, the one or more sensors 120 is configured to produce capacitive fluctuation data 117. The one or more microcontrollers 105 are configured to receive the capacitive fluctuation data 117 from the one or more sensors 120, and to process the capacitive fluctuation data 117 so that a determination can be made whether or not the dispenser 150 has been used in a compliant manner.

In some embodiments, the one or more microcontrollers 105 are configured to make the determination whether or not the dispenser 150 has been used in the compliant manner dependent on the capacitive fluctuation data 117. Alternatively, the remote server 170 is configured to make the determination whether or not the dispenser 150 has been used in the compliant manner dependent on the capacitive fluctuation data 117.

In some embodiments, the one or more sensors 120 include a capacitive sensor 135 configured to detect capacitive fluctuation data 117. The one or more sensors can include a red green blue (RGB) color sensor 149 configured to take an RGB reflectance reading of a human hand. The RGB reflectance reading can include absorption or reflectance characteristics of a human hand. The RGB reflectance reading can be provided to the one or more microprocessor controllers 105 as user identifying information 121.

The retrofit hand hygiene compliance apparatus 100 can further include one or more wireless transceivers 125. The one or more wireless transceivers 125 can be configured to detect a particular user badge (e.g., user badge 'A') having a high received RSSI relative to other candidate user badges (e.g., user badges 'B' through 'N') within a similar vicinity of the dispenser 150. The one or more microcontrollers 105 can be configured to infer that the human hand belongs to the particular user 'A' wearing the particular user badge 'A'. The one or more microcontrollers can be configured to compare a previously-stored RGB signature to the RGB reflectance reading of the human hand to verify that the human hand belongs to the particular user 'A'. Alternatively, the remote server 170 can be configured to compare a previously-stored RGB signature to the RGB reflectance reading of the human hand to verify that the human hand belongs to the particular user 'A'.

In some embodiments, the one or more microcontrollers 105 are configured to determine whether the capacitive fluctuation data 117 indicates a valid hand signal 122 or an invalid hand signal 124. Responsive to determining that the capacitive fluctuation data 117 indicates a valid hand signal 122, the one or more microcontrollers 105 can be configured to cause a valid dispense count (e.g., in user 'A; profile 163) associated with the particular user badge 'A' to be incremented.

Embodiments include a hand hygiene compliance system 160. The system 160 can include a remote server 170, a plurality of hand hygiene dispensers (e.g., 150a through 150n), and a plurality of retrofit compliance apparatuses (e.g., 100a through 100n). Each of the retrofit compliance apparatuses (e.g., 100a through 100n) can include a surface such as a drip tray 145 configured to catch fluid 152 dispensed from a corresponding hand hygiene dispenser 150 from among the plurality of hand hygiene dispensers (e.g., 150a through 150n). Each of the retrofit compliance apparatuses (e.g., 100a through 100n) can include one or more sensors 120 configured to detect usage of the corresponding hand hygiene dispenser 150, and to produce a dispense event signal 126. Each of the retrofit compliance apparatuses (e.g., 100a through 100n) can include one or more microcontrollers 105 configured to receive the dispense event signal 126 from the one or more sensors 120, and to process the dispense event signal 126 so that a determination can be made whether or not the corresponding hand hygiene dispenser 150 has been used.

In some embodiments, the one or more sensors 120 of each of the retrofit compliance apparatuses (e.g., 100a through 100n) are configured to detect user identifying information 121. The one or more microcontrollers 105 of each of the retrofit compliance apparatuses (e.g., 100a through 100n) are configured to receive the corresponding user identifying information 121 from the corresponding one or more sensors 120, and to process the user identifying information 121 so that a determination can be made regarding an identity of a user that used the corresponding hand hygiene dispenser.

In some embodiments, the one or more sensors 120 of each of the retrofit compliance apparatuses (e.g., 100a through 100n) are configured to produce corresponding capacitive fluctuation data 117. The one or more microcontrollers 105 of each of the retrofit compliance apparatuses (e.g., 100a through 100n) can be configured to receive the corresponding capacitive fluctuation 117 data from the one or more sensors 120, and to process the capacitive fluctuation data 117 so that a determination can be made whether or not the retrofit compliance apparatuses (e.g., 100a through 100n) have been used in a compliant manner.

In some embodiments, the remote server 170 is configured to make the determination whether or not the retrofit compliance apparatuses (e.g., 100a through 100n) have been used in the compliant manner dependent on the corresponding capacitive fluctuation data 117.

In some embodiments, the one or more sensors 120 of each of the retrofit compliance apparatuses (e.g., 100a through 100n) include a capacitive sensor 135 configured to detect corresponding capacitive fluctuation data 117. The one or more sensors 120 of each of the retrofit compliance apparatuses (e.g., 100a through 100n) can include an RGB color sensor 149 configured to take an RGB reflectance reading of a human hand. The RGB reflectance reading can include absorption or reflectance characteristics of the human hand. The RGB reflectance reading can be provided to the one or more microprocessor controllers 105 as user identifying information 121.

In some embodiments, each of the retrofit compliance apparatuses (e.g., 100a through 100n) further includes one or more wireless transceivers 125. The one or more wireless transceivers 125 of each of the retrofit compliance apparatuses (e.g., 100a through 100n) can be configured to detect a particular user badge having a high RSSI relative to other candidate user badges within a similar vicinity of a corresponding hand hygiene dispenser 150 from among the plurality of hand hygiene dispensers (e.g., 150*a* through 150*n*). The one or more microcontrollers 105 of each of the retrofit compliance apparatuses (e.g., 100*a* through 100*n*) can be configured to infer that the human hand belongs to the particular user (e.g., user 'A') wearing the particular user badge (e.g., user badge 'A').

In some embodiments, the remote server 170 is configured to compare a previously-stored RGB signature (e.g., RGB signature in user 'A' profile 163) to the RGB reflectance reading of the human hand to verify that the human hand belongs to the particular user (e.g., user 'A').

The remote server 170 can determine whether the corresponding capacitive fluctuation data 117 indicates a valid hand signal 122 or an invalid hand signal 124. Responsive to determining that the capacitive fluctuation data 117 indicates the valid hand signal 122, the remote server 170 can be configured to cause a valid dispense count (e.g., in user profile 163) associated with the particular user badge (e.g., user badge 'A') to be incremented.

Embodiments include a computer-implemented method for monitoring hand hygiene compliance. The method can include determining whether a hand signal associated with a human hand is valid or invalid. Responsive to determining that the hand signal is valid, the method can include measuring, by a retrofit compliance apparatus 100, an RSSI of each of a plurality of candidate user badges 'A' through 'N'. The method can include measuring, by an RGB color sensor 149 of the retrofit compliance apparatus 100, an RGB reflectance reading (e.g., 121) of a human hand associated with an initially unknown user. The method can include predicting, by comparison of the RSSI of the user badge 'A' with the RSSI of each of the other candidate user badges 'B' through 'N' from among the plurality of candidate user badges, a relative physical distance between the user badge 'A' and each of the other candidate user badges 'B' through 'N' from among the plurality of candidate user badges.

Responsive to the relative physical distance between the user badge 'A' and each of the other candidate user badges 'B' through 'N' being greater than a predefined threshold, the method can include inferring that the initially unknown user is a user 'A' wearing the user badge 'A'. The method can include saving the RGB reflectance reading of the human hand associated with the user wearing the user badge 'A' as an RGB signature in a user 'A' profile (e.g., 163) associated with the user badge 'A'. The method can include incrementing a valid dispense count in the user 'A' profile (e.g., 163) associated with the user badge 'A'.

Responsive to the relative physical distance between the user badge 'A' and one or more of the other candidate user badges 'B' through 'N' being less than a predefined threshold, the method can include comparing the RGB reflectance reading (e.g., 121) with each of a plurality of stored RGB signatures (e.g., in user profiles 167) associated with the user badges 'A' through 'N'. The method can include determining which among the stored RGB signatures is most similar to the RGB reflectance reading.

The method can include determining that a stored RGB signature associated with the user badge 'A' from among the plurality of stored RGB signatures is most similar to the RGB reflectance reading. The method can include incrementing a valid dispense count in the user 'A' profile associated with the user badge 'A'.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A retrofit hand hygiene compliance apparatus, comprising:
a surface configured to catch fluid dispensed from a hand hygiene dispenser;
one or more sensors configured to detect usage of the dispenser, and to produce a dispense event signal; and
one or more microcontrollers configured to receive the dispense event signal from the one or more sensors, and to process the dispense event signal so that a determination can be made whether or not the dispenser has been used;
wherein:
the one or more sensors include a capacitive sensor configured to detect capacitive fluctuation data; and
the one or more sensors include a red green blue (RGB) color sensor configured to take an RGB reflectance reading of a human hand, wherein the RGB reflectance reading includes at least one of absorption or reflectance characteristics of the human hand.

2. The retrofit hand hygiene compliance apparatus of claim 1, wherein:
the one or more sensors are configured to detect user identifying information; and
the one or more microcontrollers are configured to receive the user identifying information from the one or more sensors, and to process the user identifying information so that a determination can be made regarding an identity of a user that used the dispenser.

3. The retrofit hand hygiene compliance apparatus of claim 1, wherein:
the one or more sensors is configured to produce the capacitive fluctuation data; and
the one or more microcontrollers are configured to receive the capacitive fluctuation data from the one or more sensors, and to process the capacitive fluctuation data so that a determination can be made whether or not the dispenser has been used in a compliant manner.

4. The retrofit hand hygiene compliance apparatus of claim 3, wherein the one or more microcontrollers are configured to make the determination whether or not the dispenser has been used in the compliant manner dependent on the capacitive fluctuation data.

5. The retrofit hand hygiene compliance apparatus of claim 1, further comprising one or more wireless transceivers, wherein:
the one or more wireless transceivers are configured to detect a particular user badge having a high received signal strength indicator (RSSI) relative to other candidate user badges within a similar vicinity of the dispenser;
the one or more microcontrollers are configured to infer that the human hand belongs to the particular user wearing the particular user badge; and
the one or more microcontrollers are configured to compare a previously-stored RGB signature to the RGB reflectance reading of the human hand to verify that the human hand belongs to the particular user.

6. The retrofit hand hygiene compliance apparatus of claim 5, wherein:
the one or more microcontrollers are configured to determine whether the capacitive fluctuation data indicates a valid hand signal or an invalid hand signal; and
responsive to determining that the capacitive fluctuation data indicates the valid hand signal, the one or more microcontrollers are configured to cause a valid dispense count associated with the particular user badge to be incremented.

7. A hand hygiene compliance system, comprising:
a remote server;
a plurality of hand hygiene dispensers;
a plurality of retrofit compliance apparatuses, each including:
a surface configured to catch fluid dispensed from a corresponding hand hygiene dispenser from among the plurality of hand hygiene dispensers;
one or more sensors configured to detect usage of the corresponding hand hygiene dispenser, and to produce a dispense event signal; and
one or more microcontrollers configured to receive the dispense event signal from the one or more sensors, and to process the dispense event signal so that a determination can be made whether or not the corresponding hand hygiene dispenser has been used;
wherein:
the one or more sensors of each of the retrofit compliance apparatuses include a capacitive sensor configured to detect corresponding capacitive fluctuation data; and
the one or more sensors of each of the retrofit compliance apparatuses include a red green blue (RGB) color sensor configured to take an RGB reflectance reading of a human hand, wherein the RGB reflectance reading includes at least one of absorption or reflectance characteristics of the human hand.

8. The hand hygiene compliance system of claim 7, wherein:

the one or more sensors of each of the retrofit compliance apparatuses are configured to detect user identifying information; and the one or more microcontrollers of each of the retrofit compliance apparatuses are configured to receive the corresponding user identifying information from the corresponding one or more sensors, and to process the user identifying information so that a determination can be made regarding an identity of a user that used the corresponding hand hygiene dispenser.

9. The hand hygiene compliance system of claim 7, wherein:

the one or more sensors of each of the retrofit compliance apparatuses are configured to produce the corresponding capacitive fluctuation data; and the one or more microcontrollers of each of the retrofit compliance apparatuses are configured to receive the corresponding capacitive fluctuation data from the one or more sensors, and to process the capacitive fluctuation data so that a determination can be made whether or not the retrofit compliance apparatuses have been used in a compliant manner.

10. The hand hygiene compliance system of claim 9, wherein the remote server is configured to make the determination whether or not the retrofit compliance apparatuses have been used in the compliant manner dependent on the corresponding capacitive fluctuation data.

11. The hand hygiene compliance system of claim 7, wherein:

each of the retrofit compliance apparatuses further includes one or more wireless transceivers;

the one or more wireless transceivers of each of the retrofit compliance apparatuses are configured to detect a particular user badge having a high received signal strength indicator (RSSI) relative to other candidate user badges within a similar vicinity of a corresponding hand hygiene dispenser from among the plurality of hand hygiene dispensers;

the one or more microcontrollers of each of the retrofit compliance apparatuses are configured to infer that the human hand belongs to the particular user wearing the particular user badge; and the remote server is configured to compare a previously-stored RGB signature to the RGB reflectance reading of the human hand to verify that the human hand belongs to the particular user.

12. The hand hygiene compliance system of claim 11, wherein:

the remote server is configured to determine whether the corresponding capacitive fluctuation data indicates a valid hand signal or an invalid hand signal; and responsive to determining that the capacitive fluctuation data indicates the valid hand signal, the remote server is configured to cause a valid dispense count associated with the particular user badge to be incremented.

* * * * *